United States Patent
Tsuhara

(10) Patent No.: US 8,806,226 B2
(45) Date of Patent: Aug. 12, 2014

(54) AUTOMATIC VIRTUALIZATION MEDIUM, AUTOMATIC VIRTUALIZATION METHOD, AND INFORMATION PROCESSING APPARATUS

(71) Applicant: Fujitsu Limited, Kawasaki (JP)

(72) Inventor: Katsuyoshi Tsuhara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/661,701

(22) Filed: Oct. 26, 2012

(65) Prior Publication Data

US 2013/0166923 A1    Jun. 27, 2013

(30) Foreign Application Priority Data

Dec. 22, 2011    (JP) .................................. 2011-281934

(51) Int. Cl.
   *G06F 11/30*    (2006.01)
   *G06F 21/60*    (2013.01)
(52) U.S. Cl.
   CPC ............ *G06F 21/602* (2013.01); *G06F 21/604* (2013.01); *G06F 21/606* (2013.01)
   USPC ............................ 713/193; 380/255; 709/220
(58) Field of Classification Search
   CPC ........................................ G06F 21/602–21/606
   USPC ............................ 713/193; 380/255; 709/220
   See application file for complete search history.

(56) References Cited

U.S. PATENT DOCUMENTS

| 8,422,677 B2* | 4/2013 | Kitamura | ....................... 380/255 |
| 2002/0108023 A1 | 8/2002 | Constable et al. | |
| 2012/0297206 A1* | 11/2012 | Nord et al. | ..................... 713/193 |

FOREIGN PATENT DOCUMENTS

| JP | 2002-519760 | 7/2002 |
| JP | 2009-181249 | 8/2009 |

OTHER PUBLICATIONS

R.W., Watson; "Network Architecture Design for Back-End Storage Networks "; Computer; vol. 13 , Issue: 2; Digital Object Identifier: 10.1109/MC.1980.1653492; Publication Year: 1980 , pp. 32-48.*
G., Autran; et al.; "On the implementation of an agent-migration protocol"; Electrical and Computer Engineering, 2003. IEEE CCECE 2003. Canadian Conference on vol. 2; Digital Object Identifier: 10.1109/CCECE.2003.1225989; Publication Year: 2003; pp. 691-694 vol. 2.*

* cited by examiner

*Primary Examiner* — Hadi Armouche
*Assistant Examiner* — Angela Holmes
(74) *Attorney, Agent, or Firm* — Staas & Halsey LLP

(57) ABSTRACT

A computer-readable recording medium having stored therein a program for causing a computer to execute an automatic virtualization process includes creating a copy of information stored in a storage unit in a migration source, storing the created copy in a migration destination apparatus; and encrypting the storage unit in the migration source after storing the copy in the migration destination apparatus.

8 Claims, 13 Drawing Sheets

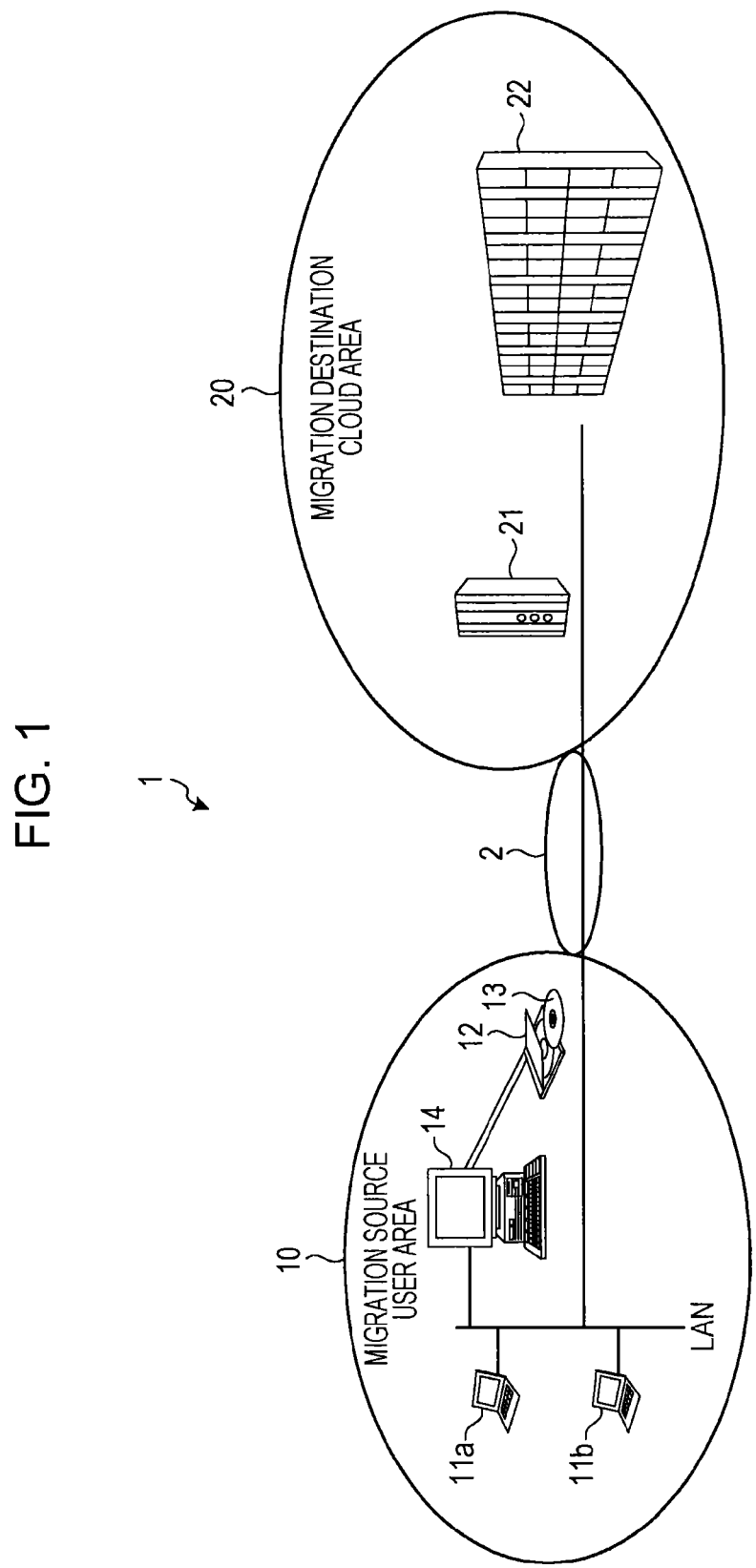

AUTOMATIC VIRTUALIZATION MEDIUM, AUTOMATIC VIRTUALIZATION METHOD, AND INFORMATION PROCESSING APPARATUS

CROSS-REFERENCE TO RELATED APPLICATION

This application is based upon and claims the benefit of priority of the prior Japanese Patent Application No. 2011-281934, filed on Dec. 22, 2011, the entire contents of which are incorporated herein by reference.

FIELD

The embodiments discussed herein are related to an automatic virtualization program, an automatic virtualization method, and an information processing apparatus.

BACKGROUND

There is a technique in the related art for moving data and an application stored in a local environment such as in a company to a cloud server in a virtualization environment and allowing a user to use the data and the application via the Internet. The construction of such a virtualization environment and the migration of data and an application to a cloud server are performed by administrators having expert knowledge (hereinafter referred to as Information Technology (IT) personnel).

Migration to a cloud server according to the related art will be described with reference to FIG. 12. FIG. 12 is a diagram illustrating exemplary migration to a cloud server according to the related art. An exemplary case in which IT personnel perform migration from a Personal Computer (PC) server 800 to a cloud server 900 will be described with reference to FIG. 12.

As illustrated in FIG. 12, a Hard Disk Drive (HDD) 810 in the PC server 800 stores an Operating System (OS) 810a, an application 810b, and data 810c. In an HDD 910 in the cloud server 900, a virtualization environment 910a and an OS 910b having a new license are prepared in advance.

IT personnel install the application 810b (application soft 820) in the HDD 910 after deleting the application 810b from the HDD 810. Subsequently, IT personnel manually copy the data 810c. Thus, IT personnel perform the migration from the PC server 800 to the cloud server 900.

The migration to a cloud server puts IT personnel to much trouble. It is difficult for an average user who has no expert knowledge to perform the migration to a cloud server. In recent years, there has been automatic virtualization software with which the construction of a virtualization environment and the migration to a cloud server are automated. The migration to a virtualization environment performed with automatic virtualization software will be described with reference to FIG. 13.

FIG. 13 is a diagram illustrating exemplary migration to a virtualization environment performed with automatic virtualization software. As illustrated in FIG. 13, the virtualization environment 910a is prepared in the HDD 910 in advance. When automatic virtualization software 830 is started, the OS 810a, the application 810b, and the data 810c stored in the HDD 810 are created as an image file 810d and the image file 810d is transferred to the HDD 910. In the HDD 910, the image file 810d performs a function similar to that of the HDD 810.

Thus, the automatic virtualization software simplifies the migration to a cloud server and allows an average user who has no expert knowledge to easily perform the migration to a cloud server.

Japanese Laid-open Patent Publication No. 2009-181249 and Japanese National Publication of International Patent Application No. 2002-519760 are examples of the related art.

However, the above-described related art causes license violation when the migration of software is automated.

More specifically, in a case where automatic virtualization software is used, software is installed in both a migration source HDD and a migration destination HDD. That is, the license violation of the software occurs. It is desired that the software installed in the migration source HDD not be deleted before the operation of the image file in the migration destination HDD is checked.

For example, in a case where the image file is transferred to the migration destination HDD after the software installed in the migration source HDD has been deleted, the software and the data are deleted. Accordingly, in a case where virtualization fails in the migration destination HDD, it is difficult to restore the migration source HDD to an original state.

In addition, since an average user who does not recognize the presence of a license can easily perform the construction of a virtualization environment and the migration to a cloud server, the software may not be deleted from the migration source HDD after the operation of the image file has been checked in the migration destination HDD.

SUMMARY

According to an aspect of the embodiments, a medium includes a computer-readable recording medium having stored therein a program for causing a computer to execute an automatic virtualization process includes creating a copy of information stored in a storage unit in a migration source, storing the created copy in a migration destination apparatus; and encrypting the storage unit in the migration source after storing the copy in the migration destination apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an exemplary configuration of an information processing system according to a first embodiment.

DESCRIPTION OF EMBODIMENTS

Figure 2A:
FIG. 2A is a diagram illustrating an example of a state of a PC server before migration to a cloud area.

An automatic virtualization program, and automatic virtualization method, and an information processing apparatus according to an embodiment of the present disclosure will be described in detail below. The present disclosure is not limited to the following embodiments.

[First Embodiment]
[Configuration of Information Processing System]

FIG. 1 is a diagram illustrating an exemplary configuration of an information processing system according to the first embodiment. As illustrated in FIG. 1, an information processing system 1 includes a migration source user area 10 and a migration destination cloud area 20. The migration source user area 10 and the migration destination cloud area 20 are connected to each other via a network 2 that provides a Local Area Network (LAN) connection by providing a tunnel connection on a Wide Area Network (WAN).

The migration source user area 10 includes clients 11a and 11b, a medium reading drive 12, automatic virtualization and shredder software 13, and a Personal Computer (PC) server 14. The numbers of clients and PC servers included in the migration source user area 10 are not limited to the above-described numbers.

Each of the clients 11a and 11b uses data and an application stored in the PC server 14 or a cloud physical server 22 via the Internet to execute various pieces of processing received from a user. The clients 11a and 11b are collectively called a client 11.

The medium reading drive 12 reads data from a recording medium provided as a disk and writes the data in the PC server 14 via a connection interface such as a Universal Serial Bus (USB).

The automatic virtualization and shredder software 13 is software that causes a computer to execute automatic HDD virtualization processing and processing for encrypting and decrypting a migration source HDD. The automatic virtualization and shredder software 13 causes the PC server 14 to execute each piece of processing when being inserted in the medium reading drive 12.

The PC server 14 includes an HDD 15 (not illustrated) storing data and an application and receives accesses to the data and the application from the clients 11a and 11b. When the automatic virtualization and shredder software 13 is started, the PC server 14 performs automatic virtualization processing to be described later. The PC server 14 may be an information processing apparatus such as a UNIX (registered trademark) server.

The migration destination cloud area 20 includes a cloud management server 21 and a cloud physical server 22. The cloud management server 21 and the cloud physical server 22 are connected to each other so that they can communicate with each other on a LAN.

For example, the cloud management server 21 performs configuration management, update management, operation monitoring, log collection, and virtualization environment management for the cloud physical server 22.

A virtualization environment is constructed in the cloud physical server 22. The cloud physical server 22 include an HDD 23 (not illustrated) storing data and an application and receives accesses to the data and the application from the clients 11a and 11b. A virtualization environment provided by the cloud physical server 22 is referred to as a user area as appropriate.

Processing operations performed when the PC server 14 in the information processing system 1 starts the automatic virtualization and shredder software 13 will be described with reference to FIGS. 2A to 2C.

FIG. 2A is a diagram illustrating an example of a state of a PC server before migration to a cloud area. As illustrated in FIG. 2A, the HDD 15 in the PC server 14 stores an OS 15a, an application 15b, and data 15c. In the HDD 23 in the cloud physical server 22, a virtualization environment 23a is prepared in advance.

Figure 2B:
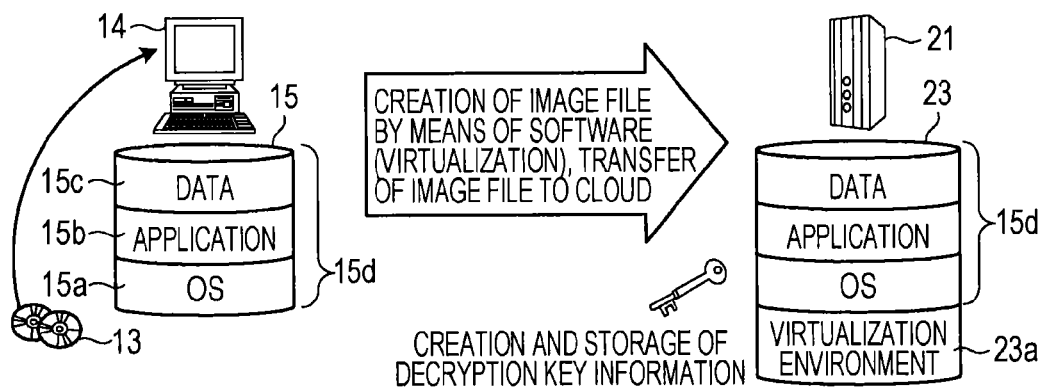
FIG. 2B is a diagram illustrating an exemplary operation of a PC server at the time of migration to a cloud area.

FIG. 2B is a diagram illustrating an exemplary operation of a PC server at the time of migration to a cloud area. The PC server 14 starts the automatic virtualization and shredder software 13, and performs the following processing when receiving the selection of cloud area migration processing from a user.

That is, the PC server 14 copies information stored in the HDD 15 and stores the copied information in the HDD 23 in the cloud physical server 22. For example, the PC server 14 creates an image file 15d from the OS 15a, the application 15b, and the data 15c which are stored in the HDD and transmits the created image file 15d to the cloud management server 21.

The cloud management server 21 stores the image file 15d received from the PC server 14 in the HDD 23. The cloud management server 21 creates an encryption key and a decryption key and transmits the created encryption key to the PC server 14. The cloud management server 21 stores the decryption key.

The PC server 14 encrypts the HDD 15 after storing the copy in the HDD 23. For example, the PC server 14 encrypts the HDD 15 with the encryption key. As a result, it is difficult for the client 11 to use the OS 15a, the application 15b, and the data 15c even when accessing the HDD 15.

After migration to a cloud environment, a case where a processing speed is slower than expected or a case where an environment suitable for an operation is not the cloud environment may occur. In such a case, as illustrated in FIG. 2C, the PC server 14 restores the information stored in the HDD 15 in the PC server 14.

Figure 2C:
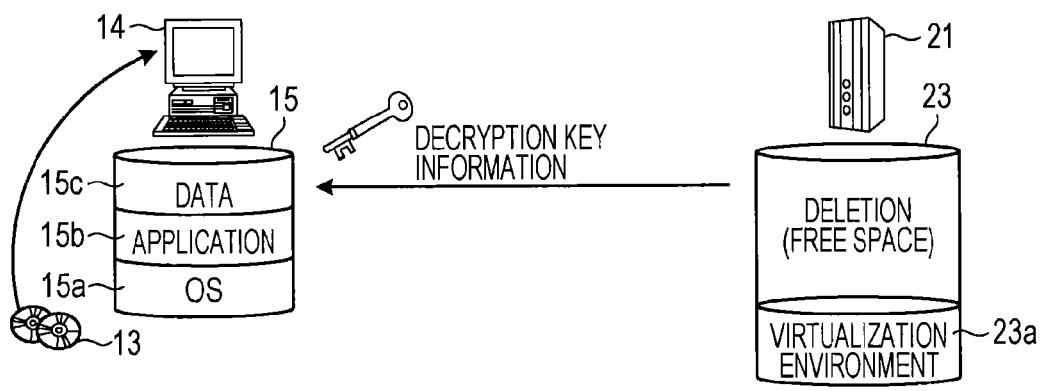
FIG. 2C is a diagram illustrating an exemplary operation of a PC server at the time of restoration of information from a cloud area.

FIG. 2C is a diagram illustrating an exemplary operation of a PC server at the time of restoration of information from a cloud area. As illustrated in FIG. 2C, when the PC server 14 starts the automatic virtualization and shredder software 13 and receives the selection of processing for restoring information from a cloud area from a user, the PC server 14 instructs the cloud management server 21 to delete the image file 15*d* stored in the HDD 23.

The cloud management server 21 deletes the image file 15*d* from the HDD 23 and transmits the decryption key to the PC server 14. The PC server 14 receives the decryption key from the cloud management server 21 and decrypts the encrypted HDD 15 with the decryption key.

Thus, in the information processing system 1, the PC server 14 creates an image file of the HDD 15, transfers the image file to the HDD 23, and encrypts the HDD 15 so as not to allow the OS 15*a* and the application 15*b* to be used in the HDDs 15 and 23 at the same time. As a result, even in a case where migration of the OS 15*a* and the application 15*b* is automated, license violation does not occur in the PC server 14.

In the information processing system 1, the OS 15*a* and the application 15*b* stored in the HDD 15 are encrypted and stored. Accordingly, in a case where virtualization fails or a state after migration is not user-friendly, the HDD 15 can be restored to its previous state before migration with certainty. At that time, restoration can be easily performed without special knowledge and many procedures.

[Configuration of PC Server According to First Embodiment]

Figure 3:
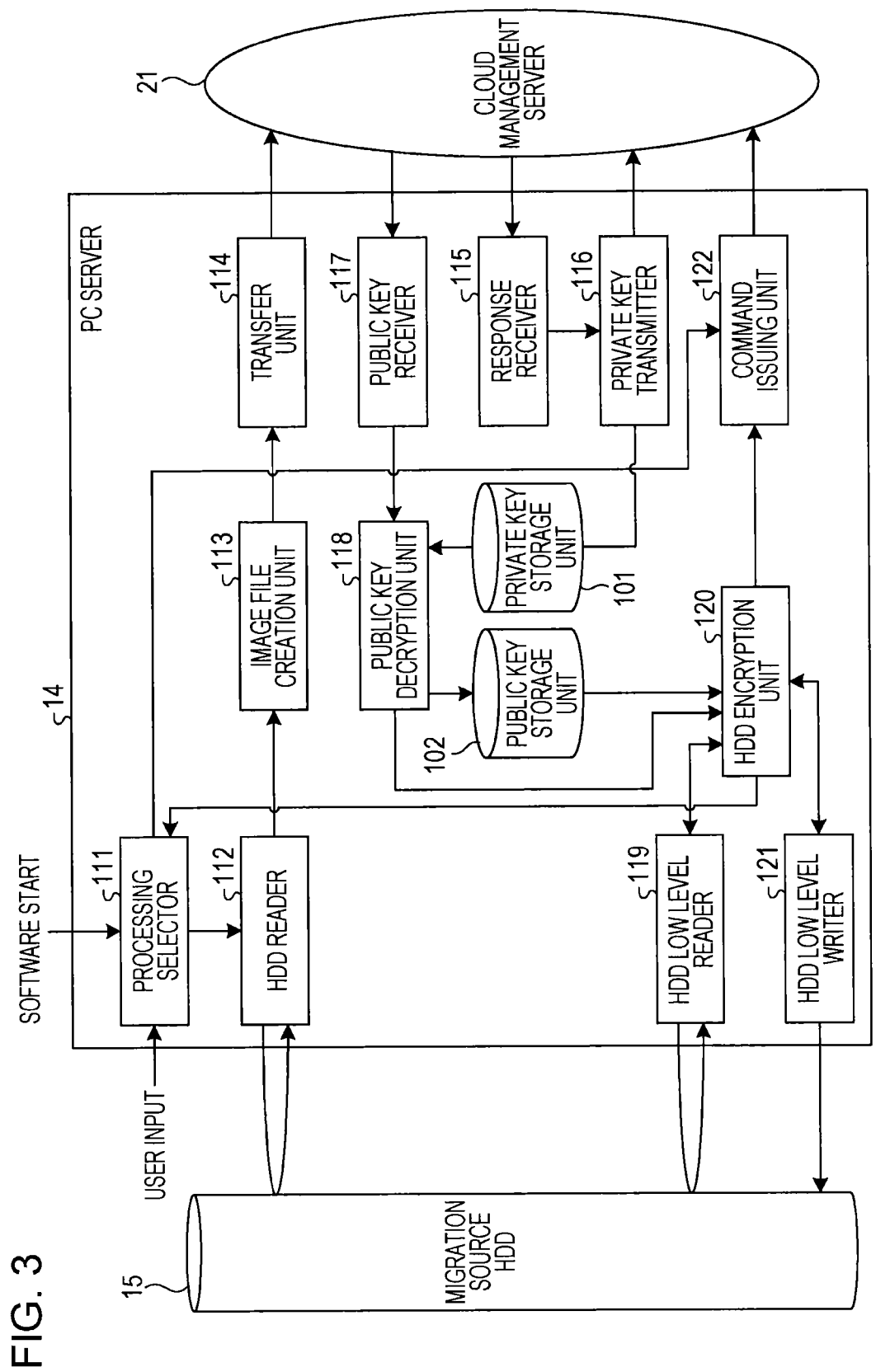
FIG. 3 is a functional block diagram illustrating the functional configuration of a PC server according to the first embodiment.

Next, the functional configuration of the PC server 14 according to the first embodiment will be described with reference to FIG. 3. FIG. 3 is a functional block diagram illustrating the functional configuration of a PC server according to the first embodiment. An exemplary case in which the PC server 14 starts the automatic virtualization and shredder software 13 will be described.

As illustrated in FIG. 3, the PC server 14 according to the first embodiment includes a private key storage unit 101, a public key storage unit 102, a processing selector 111, an HDD reader 112, an image file creation unit 113, a transfer unit 114, a response receiver 115, a private key transmitter 116, and a public key receiver 117. The PC server 14 further includes a public key decryption unit 118, an HDD low level reader 119, an HDD encryption unit 120, HDD low level writer 121, and a command issuing unit 122.

The private key storage unit 101 stores a private key. In the following description, a private key is referred to as a private key K1 as appropriate. When the PC server 14 starts the automatic virtualization and shredder software 13, the private key K1 is stored in the private key storage unit 101.

The public key storage unit 102 stores a public key. For example, the public key storage unit 102 stores an encryption key and a decryption key that have been decrypted by the public key decryption unit 118 to be described later as public keys. In the following description, an encryption key and a decryption key are referred to as an encryption key Ka and a decryption key Kb, respectively, as appropriate. As will be described later, a public key is encrypted or decrypted with the private key K1. An encrypted encryption key and an encrypted decryption key are therefore referred to as an encryption key Ka' and a decryption key Kb', respectively, as appropriate. The encryption key Ka and the decryption key Kb are collectively referred to as a public key.

When the automatic virtualization and shredder software 13 is started, the processing selector 111 receives various processing selections from a user. For example, when the processing selector 111 receives the selection of migration to a cloud environment, the processing selector 111 instructs the HDD reader 112 to read information stored in the HDD 15.

When the processing selector 111 receives the selection of switching back from a cloud environment from a user, the processing selector 111 instructs the command issuing unit 122 to issue an image file deletion command to the cloud management server 21.

When the processing selector 111 receives from the HDD encryption unit 120 a notification that the decryption of the HDD 15 has been completed, the processing selector 111 instructs a user to restart the PC server 14 via an output unit (not illustrated).

When the HDD reader 112 receives the selection of migration to a cloud environment from the processing selector 111, the HDD reader 112 reads information stored in the HDD 15 and outputs the read information to the image file creation unit 113. For example, the HDD reader 112 reads information including an OS, an application, and data stored in the HDD 15 and outputs the read information to the image file creation unit 113.

The image file creation unit 113 creates an image file from the information received from the HDD reader 112 and outputs the created image file to the transfer unit 114.

The transfer unit 114 transfers the image file created by the image file creation unit 113 to the cloud management server 21. For example, the transfer unit 114 transfers information about the association between a user Identifier (ID) and an image file ID and the image file to the cloud management server 21.

The response receiver 115 receives a response indicating that the image file has been started from the cloud management server 21 and notifies the private key transmitter 116 that it has received the response from the cloud management server 21.

When the private key transmitter 116 receives from the response receiver 115 a notification that the response receiver 115 has received an image file startup completion response from the cloud management server 21, the private key transmitter 116 transmits the private key K1 stored in the private key storage unit 101 to the cloud management server 21.

The public key receiver 117 receives an encrypted public key from the cloud management server 21 and outputs the received public key to the public key decryption unit 118. For example, the public key receiver 117 receives from the cloud management server 21 the encrypted encryption key Ka' at the time of migration to a cloud environment. In addition, the public key receiver 117 receives from the cloud management server 21 the encrypted decryption key Kb' at the time of switching back from the cloud environment.

The public key decryption unit 118 decrypts the public key received from the public key receiver 117 with the private key K1 stored in the private key storage unit 101. For example, the public key decryption unit 118 decrypts the encryption key Ka' with the private key K1 so as to create the encryption key Ka. In addition, the public key decryption unit 118 decrypts the decryption key Kb' with the private key K1 so as to create the decryption key Kb. The public key decryption unit 118 stores the decrypted public key in the public key storage unit 102.

In a case where the decrypted public key is the encryption key Ka, the public key decryption unit 118 notifies the HDD encryption unit 120 that the public key has been decrypted.

When the HDD encryption unit 120 receives from the public key decryption unit 118 a notification that the public key has been decrypted, the HDD encryption unit 120 requests the HDD low level reader 119 to read binary data.

When the HDD low level reader 119 is requested by the HDD encryption unit 120 to read binary data, the HDD low level reader 119 reads binary data from the HDD 15 and outputs the read binary data to the HDD encryption unit 120.

The HDD encryption unit 120 encrypts or decrypts the binary data read by the HDD low level reader 119 with the public key read from the public key storage unit 102 and outputs the encrypted or decrypted binary data to the HDD low level writer 121.

The HDD low level writer 121 writes back the encrypted or decrypted binary data received from the HDD encryption unit 120 into the HDD 15. The HDD low level writer 121 notifies the HDD encryption unit 120 that the binary data has been written back into the HDD 15.

When the HDD encryption unit 120 is notified by the HDD low level writer 121 that the encrypted binary data has been written back into the HDD 15, the HDD encryption unit 120 notifies the command issuing unit 122 that the encryption of the HDD 15 has been completed.

When the HDD encryption unit 120 is notified by the HDD low level writer 121 that the decrypted binary data has been written back into the HDD 15, the HDD encryption unit 120 notifies the processing selector 111 that the decryption of the HDD 15 has been completed.

When the command issuing unit 122 is notified by the HDD encryption unit 120 that the encryption of the HDD 15 has been completed, the command issuing unit 122 issues a command instructing the provision of a virtualization environment to the cloud management server 21.

When the command issuing unit 122 receives the selection of switching back from a cloud environment from the processing selector 111, the command issuing unit 122 issues a command instructing the deletion of an image file to the cloud management server 21.

The private key storage unit 101 and the public key storage unit 102 are included in a storage device such as a semiconductor memory element or hard disk. The components including the processing selector 111 to the command issuing unit 122 are provided in the form of an electronic circuit such as a Central Processing Unit (CPU) or a Micro Processing Unit (MPU).

[Configuration of Cloud Management Server]

Figure 4:
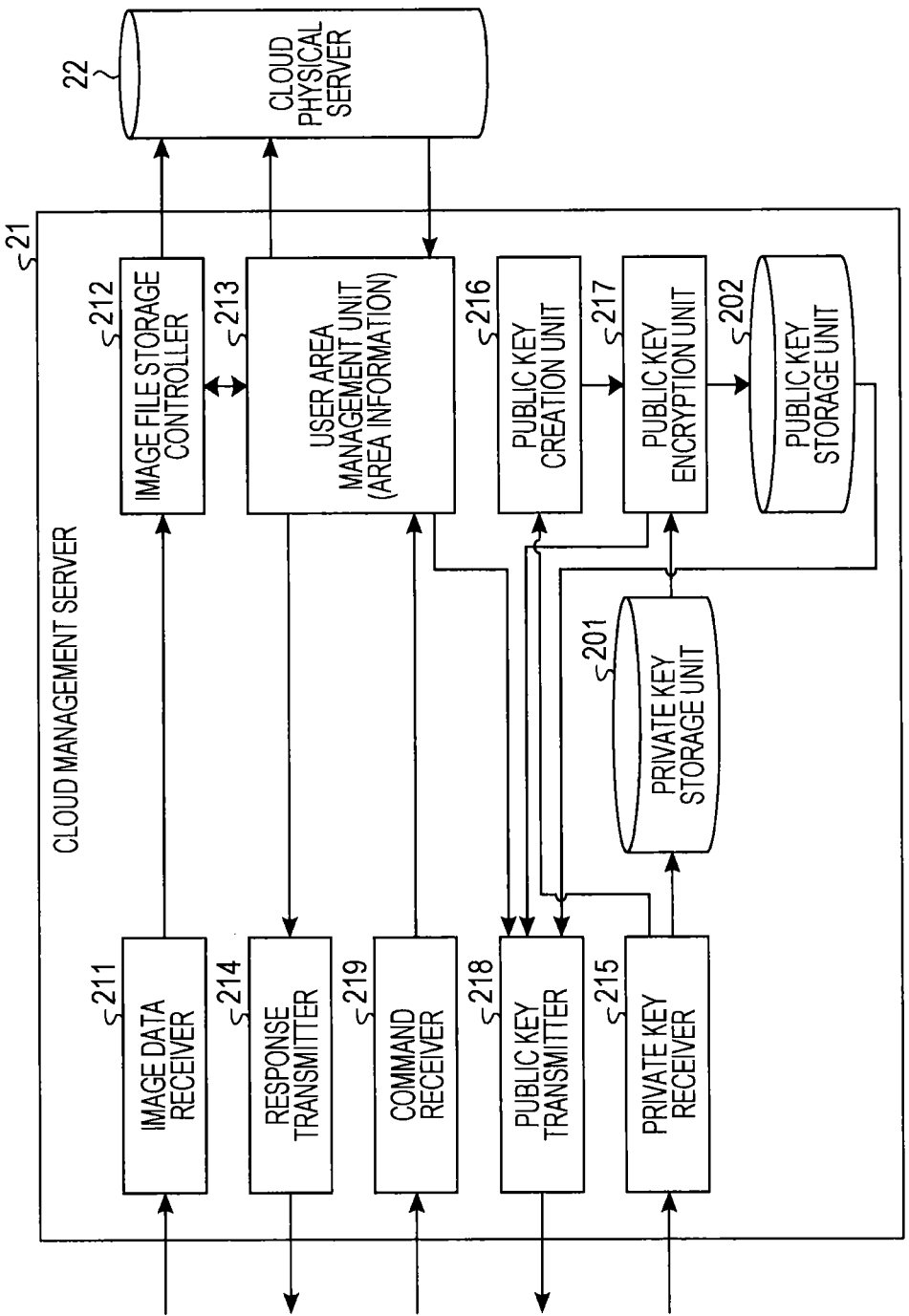
FIG. 4 is a functional block diagram illustrating the functional configuration of a cloud management server according to the first embodiment.

Next, the functional configuration of the cloud management server 21 according to the first embodiment will be described with reference to FIG. 4. FIG. 4 is a functional block diagram illustrating the functional configuration of a cloud management server according to the first embodiment. As illustrated in FIG. 4, the cloud management server 21 according to the first embodiment includes a private key storage unit 201, a public key storage unit 202, an image data receiver 211, an image file storage controller 212, a user area management unit 213, a response transmitter 214, and a private key receiver 215. The cloud management server 21 further includes a public key creation unit 216, a public key encryption unit 217, a public key transmitter 218, and a command receiver 219.

The private key storage unit 201 stores a private key. For example, the private key storage unit 201 stores the private key K1 received from the PC server 14 via the private key receiver 215 to be described later.

The public key storage unit 202 stores an encrypted public key. For example, the public key storage unit 202 stores the encryption key Ka' and the decryption key Kb' which have been encrypted by the public key encryption unit 217 to be described later.

The image data receiver 211 receives an image file from the PC server 14 and outputs the received image file to the image file storage controller 212.

The image file storage controller 212 stores the image file received from the image data receiver 211 in the HDD 23 included in the cloud physical server 22. The image file storage controller 212 requests the user area management unit 213 to provide storage destination information indicating the address of a storage destination of an image file, stores the image file on the basis of the storage destination information provided by the user area management unit 213, and notifies the user area management unit 213 that the image file has been stored in the HDD 23.

The user area management unit 213 notifies the image file storage controller 212 of the storage destination information requested by the image file storage controller 212. For example, the user area management unit 213 determines a storage destination address on the basis of a user ID and an image file ID.

When the user area management unit 213 is notified by the image file storage controller 212 that the image file has been stored in the HDD 23, the user area management unit 213 transmits an instruction for starting the HDD 23 and checks whether the HDD 23 has been started. When the user area management unit 213 checks that the HDD 23 has been started, the user area management unit 213 notifies the response transmitter 214 that the HDD 23 has been started.

When the user area management unit 213 is notified by the command receiver 219 that a user area will be opened for the client 11, the user area management unit 213 instructs the cloud physical server 22 to open the user area for the client 11. As a result, the client 11 can access the user area.

When the user area management unit 213 is notified by the command receiver 219 that the image file stored in the HDD 23 will be deleted, the user area management unit 213 instructs the cloud physical server 22 to delete the image file, receives a notification that the deletion of the image file from the HDD 23 has been completed from the cloud physical server 22, and notifies the public key transmitter 218 that the deletion of the image file has been completed.

When the response transmitter 214 is notified by the user area management unit 213 that the HDD 23 has been started, the response transmitter 214 notifies the PC server 14 that the HDD 23 has been started.

The private key receiver 215 receives the private key K1 from the PC server 14, stores the received key K1 in the private key storage unit 201, and notifies the public key creation unit 216 that the private key K1 has been received.

The public key creation unit 216 creates a public key. For example, when the public key creation unit 216 is notified by the private key receiver 215 that the private key K1 has been received, the public key creation unit 216 creates the encryption key Ka and the decryption key Kb and outputs the created public keys to the public key encryption unit 217.

The public key encryption unit 217 encrypts the public keys created by the public key creation unit 216 with the private key K1 stored in the private key storage unit 201 and stores the encrypted public keys in the public key storage unit 202. For example, the public key encryption unit 217 encrypts the encryption key Ka with the private key K1 so as to create the encryption key Ka'. In addition, the public key encryption unit 217 encrypts the decryption key Kb with the private key K1 so as to create the decryption key Kb'. The public key encryption unit 217 notifies the public key transmitter 218 that the public keys have been encrypted.

The public key transmitter 218 reads the encrypted public key from the public key storage unit 202 and transmits the encrypted public key to the PC server 14. For example, when the public key transmitter 218 is notified by the public key encryption unit 217 that a public key has been encrypted, the public key transmitter 218 reads the encryption key Ka' from the public key storage unit 202 and transmits the encryption key Ka' to the PC server 14. When the public key transmitter 218 is notified by the user area management unit 213 that the deletion of the image file has been completed, the public key transmitter 218 reads the decryption key Kb' from the public key storage unit 202 and transmits the decryption key Kb' to the PC server 14.

When the command receiver 219 receives a command instructing the provision of a virtualization environment from the PC server 14, the command receiver 219 notifies the user area management unit 213 that the user area will be opened for the client 11.

When the command receiver 219 receives a command instructing the deletion of an image file from the PC server 14, the command receiver 219 notifies the user area management unit 213 that the image file will be deleted from the user area.

The private key storage unit 201 and the public key storage unit 202 are included in, for example, a storage device such as a semiconductor memory element or a hard disk. The components including the image data receiver 211 to the command receiver 219 are provided in the form of an electronic circuit such as a Central Processing Unit (CPU) or a Micro Processing Unit (MPU).

[Processing Operation in Information Processing System According to First Embodiment]

Next, processing operations performed in the information processing system 1 according to the first embodiment will be described with reference to FIGS. 5 and 6. Processing operations performed in the information processing system 1 according to the first embodiment at the time of migration to a cloud environment will be described with reference to FIG. 5. Processing operations performed in the information processing system 1 according to the first embodiment at the time of switching back from the cloud environment will be described with reference to FIG. 6.

(Process of Migration to Cloud Environment)

Figure 5:
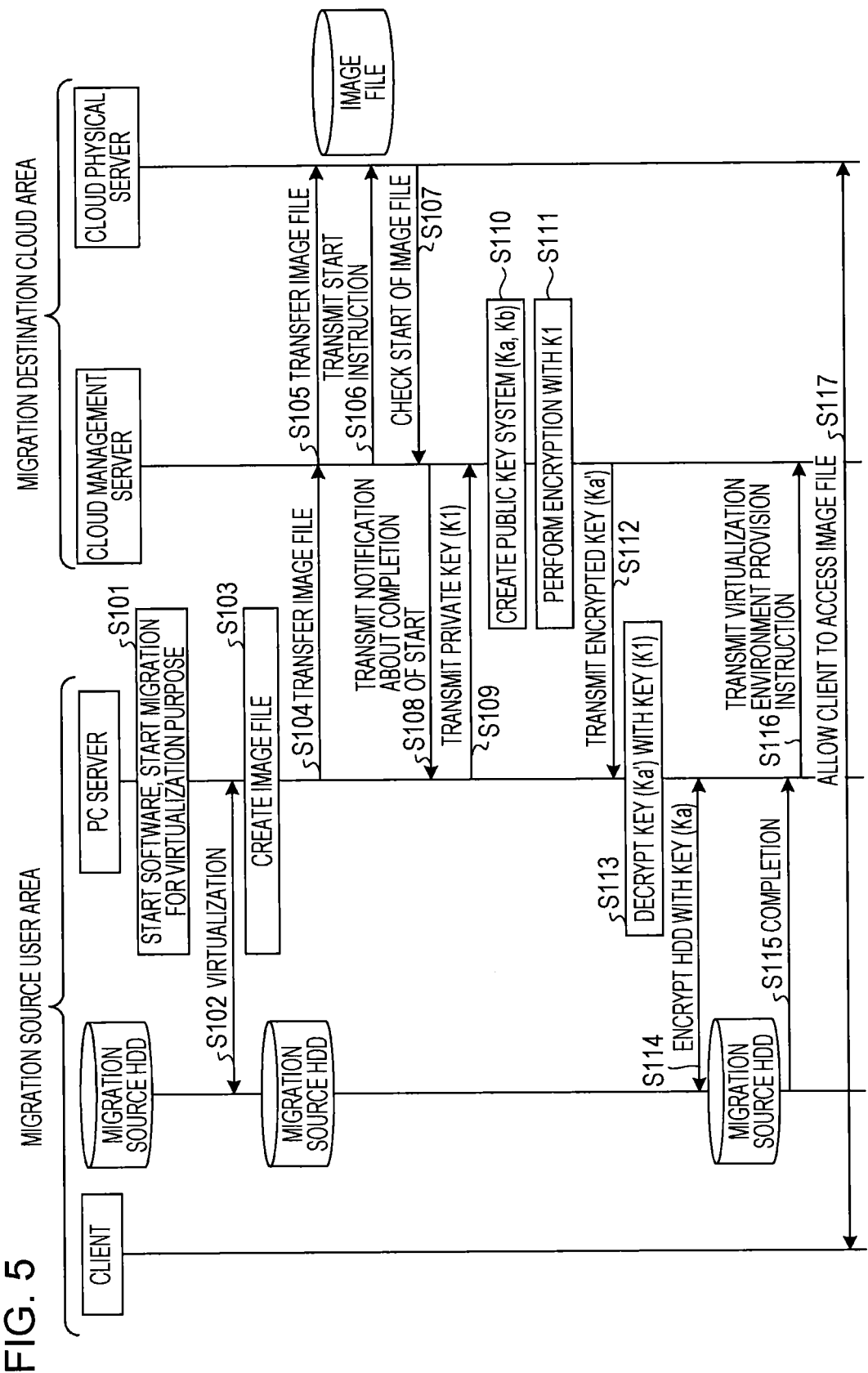
FIG. 5 is a sequence diagram illustrating processing operations performed in an information processing system according to the first embodiment at the time of migration to a cloud environment.

FIG. 5 is a sequence diagram illustrating processing operations performed in an information processing system according to the first embodiment at the time of migration to a cloud environment. As illustrated in FIG. 5, in the PC server 14 that has started the automatic virtualization and shredder software 13, when the processing selector 111 receives the selection of migration for the purpose of virtualization (hereinafter referred to as virtualization migration processing) from a user, the processing selector 111 instructs the HDD reader 112 to start virtualization migration processing (operation S101). The HDD reader 112 reads information including an OS, an application, and data stored in the HDD 15 and outputs the read information to the image file creation unit 113 (operation S102). The image file creation unit 113 creates an image file (operation S103). The transfer unit 114 transfers the image file to the cloud management server 21 (operation S104).

In the cloud management server 21, the image data receiver 211 receives the image file and the image file storage controller 212 stores the image file in the HDD 23 (operation S105).

The user area management unit 213 instructs the HDD 23 to start the image file (operation S106) and checks whether the image file has been started (operation S107). The response transmitter 214 notifies the PC server 14 that the start of the image file has been completed (operation S108).

In the PC server 14, when the response receiver 115 is notified that the start of the image file has been completed in the HDD 23, the private key transmitter 116 reads the private key K1 from the private key storage unit 101 and transmits the private key K1 to the cloud management server 21 (operation S109).

In the cloud management server 21, when the private key receiver 215 receives the private key K1, the public key creation unit 216 creates the encryption key Ka and the decryption key Kb (operation S110). The public key encryption unit 217 encrypts the encryption key Ka and the decryption key Kb so as to create the encryption key Ka' and the decryption key Kb', respectively (operation S111). The public key transmitter 218 transmits the encrypted encryption key Ka' to the PC server 14 (operation S112).

In the PC server 14, the public key decryption unit 118 decrypts the encryption key Ka', which has been received from the cloud management server 21 via the public key receiver 117, with the private key K1 (operation S113). When the HDD encryption unit 120 is notified by the public key decryption unit 118 that the encryption key Ka' has been decrypted, the HDD encryption unit 120 encrypts the binary data read from the HDD 15 by the HDD low level reader 119 with the encryption key Ka (operation S114).

The HDD low level writer 121 writes the encrypted binary data received from the HDD encryption unit 120 back into the HDD 15 and notifies the HDD encryption unit 120 that the encrypted binary data has been written back into the HDD 15 (operation S115).

The command issuing unit 122 issues a command instructing the provision of a virtualization environment to the cloud management server 21 (operation S116). As a result, the client 11 can access the image file in the cloud physical server 22 (operation S117).

(Switching Back from Cloud Environment)

Figure 6:
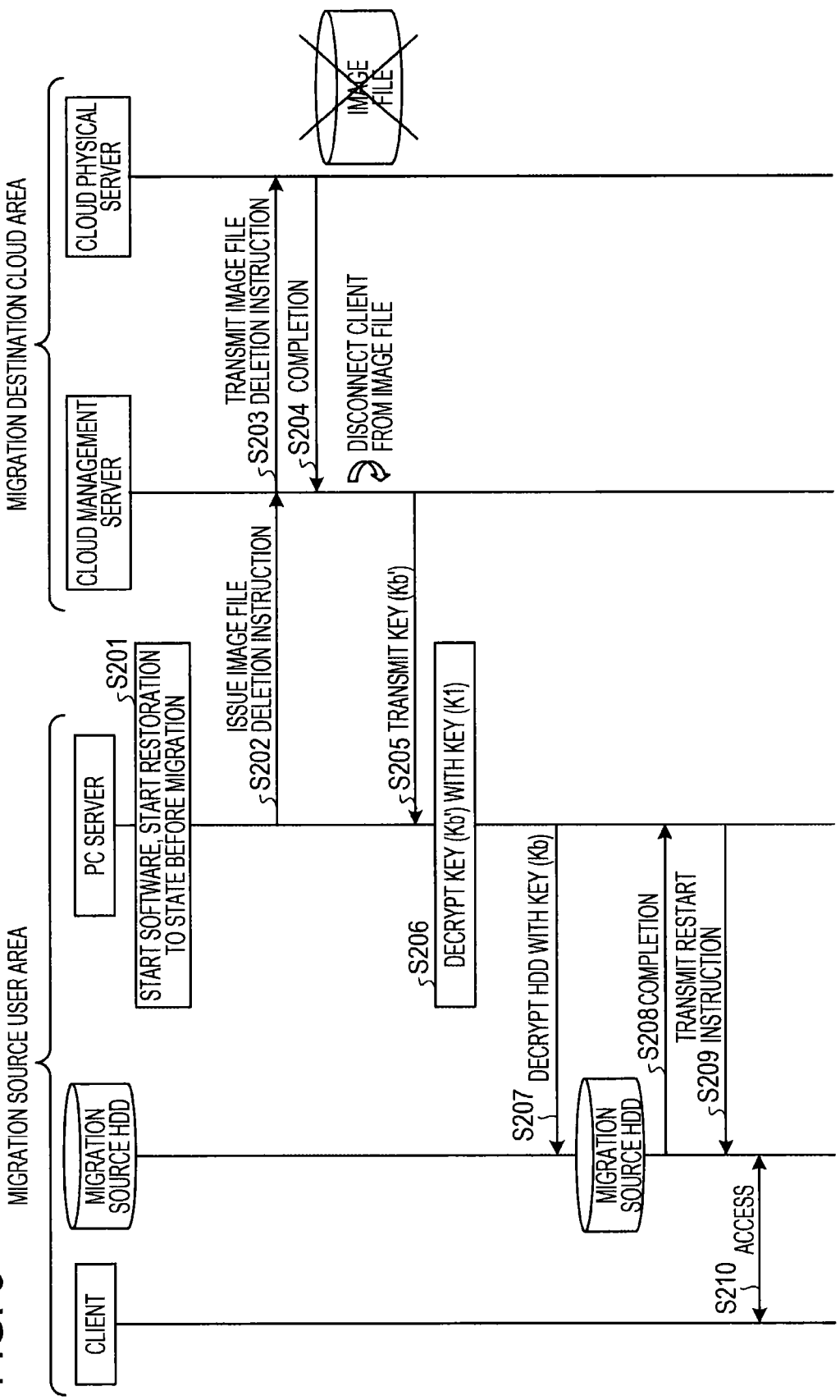
FIG. 6 is a sequence diagram illustrating processing operations performed in an information processing system according to the first embodiment at the time of switching back from a cloud environment.

FIG. 6 is a sequence diagram illustrating processing operations performed in an information processing system according to the first embodiment at the time of switching back from a cloud environment. As illustrated in FIG. 6, in the PC server 14 that has started the automatic virtualization and shredder software 13, when the processing selector 111 receives the selection of processing for restoring a state before migration (operation S201), the command issuing unit 122 issues a command instructing the deletion of an image file to the cloud management server 21 (operation S202).

In the cloud management server 21, when the command receiver 219 receives the command instructing the deletion of an image file from the PC server 14, the user area management unit 213 instructs the user area to delete the image file (operation S203). The user area management unit 213 receives a notification that the deletion of the image file has been completed from the cloud physical server 22 (operation S204). The public key transmitter 218 transmits the decryption key Kb' read from the public key storage unit 202 to the PC server 14 (operation S205).

In the PC server 14, when the public key receiver 117 receives the decryption key Kb' from the cloud management server 21, the public key decryption unit 118 decrypts the encrypted decryption key Kb' with the private key K1 (operation S206). When the HDD encryption unit 120 is notified by the public key decryption unit 118 that the decryption key Kb' has been decrypted, the HDD encryption unit 120 decrypts the encrypted binary data, which has been read from HDD 15 by the HDD low level reader 119, with the decryption key Kb (operation S207).

The HDD low level writer 121 writes the decrypted binary data received from the HDD encryption unit 120 back into the HDD 15 and notifies the HDD encryption unit 120 that the decrypted binary data has been written back into the HDD 15 (operation S208).

When the processing selector 111 is notified by the HDD encryption unit 120 that the decryption of the HDD 15 has been completed, the processing selector 111 instructs a user to restart the PC server 14 via an output unit (not illustrated) (operation S209). As a result, the client 11 can access the HDD 15 in the PC server 14 (operation S210).

[Effect of First Embodiment]

As described previously, in the PC server 14, the user area is opened after the migration source HDD 15 has been encrypted. As a result, even in a case where the migration of software is automated, license violation does not occur. Furthermore, it is possible to easily move an environment used to a cloud without special knowledge.

In a case where virtualization fails or a state after migration is not user-friendly, switching back to a state before the migration is performed. On the other hand, in order to avoid a license problem, a license in a migration source is deleted when a virtualized environment is used. In the PC server 14, by encrypting the state of the HDD 15 at the time of virtualization and keeping the encrypted state, it is possible to restore a previous state with certainty. Furthermore, the restoration can be easily performed without special knowledge and many procedures.

In the information processing system 1, since the encryption key Ka used at the time of migration is not used at the time of decryption and the encryption key Ka is a public key, it is difficult for a malicious user to perform decryption even in a case where the user knows the encryption key Ka. That is, a security level can be increased.

In the information processing system 1, the cloud management server 21 manages the decryption key Kb. Accordingly, even in a case where a malicious user obtains the decryption key Kb in some manner, the HDD 15 is not decrypted.

In the information processing system 1, the decryption key Kb used for decryption is encrypted with the private key K1 and the private key K1 and the encrypted decryption key Kb' are separately stored. Accordingly, a security level can be further increased. Furthermore, by keeping the encryption algorithm of a private key system secret, the decryption key Kb is not extracted from the encrypted decryption key Kb' even in a case where the private key K1 and the encrypted decryption key Kb' are obtained.

[Second Embodiment]

In the first embodiment, migration to a cloud environment has been described. In a local environment such as in a company, migration from a server to another server of the same user may be performed. In the second embodiment, the migration from a server to another server of the same user in a local environment will be described.

[Configuration of Information Processing System]

Figure 7:
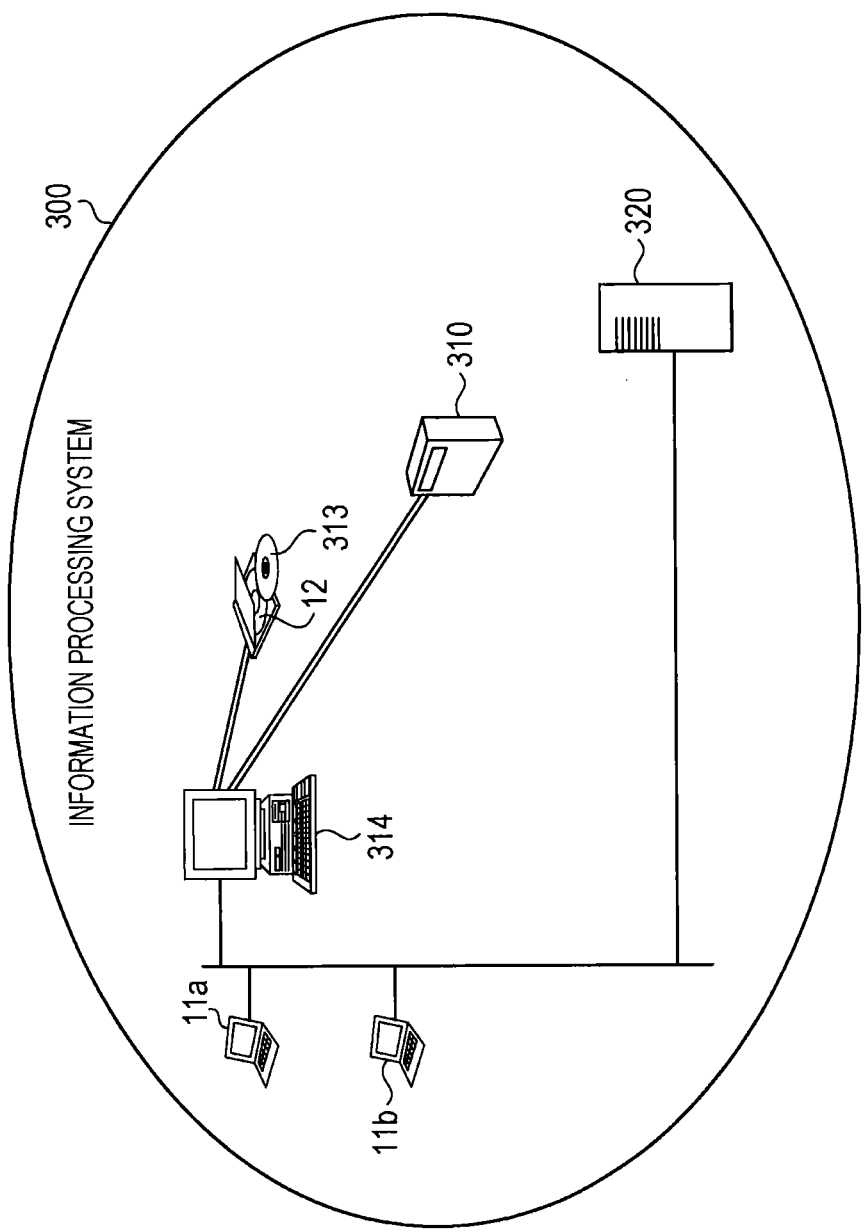
FIG. 7 is a diagram illustrating an exemplary configuration of an information processing system according to a second embodiment.

FIG. 7 is a diagram illustrating an exemplary configuration of an information processing system according to a second embodiment. As illustrated in FIG. 7, an information processing system 300 according to the second embodiment includes clients 11a and 11b, the medium reading drive 12, a USB-compliant HDD 310, automatic virtualization and shredder software 313, and PC servers 314 and 320. The clients 11a and 11b and the PC servers 314 and 320 are connected to one another so that they can communicate with one another via a network such as a LAN. The same reference numerals are used to identify parts already described with reference to FIG. 1, and the description thereof will be therefore omitted. A connection interface between the USB-compliant HDD 310 and each of the PC servers 314 and 320 is not limited to a USB interface.

[Configuration of PC Server according to Second Embodiment]

Figure 8:
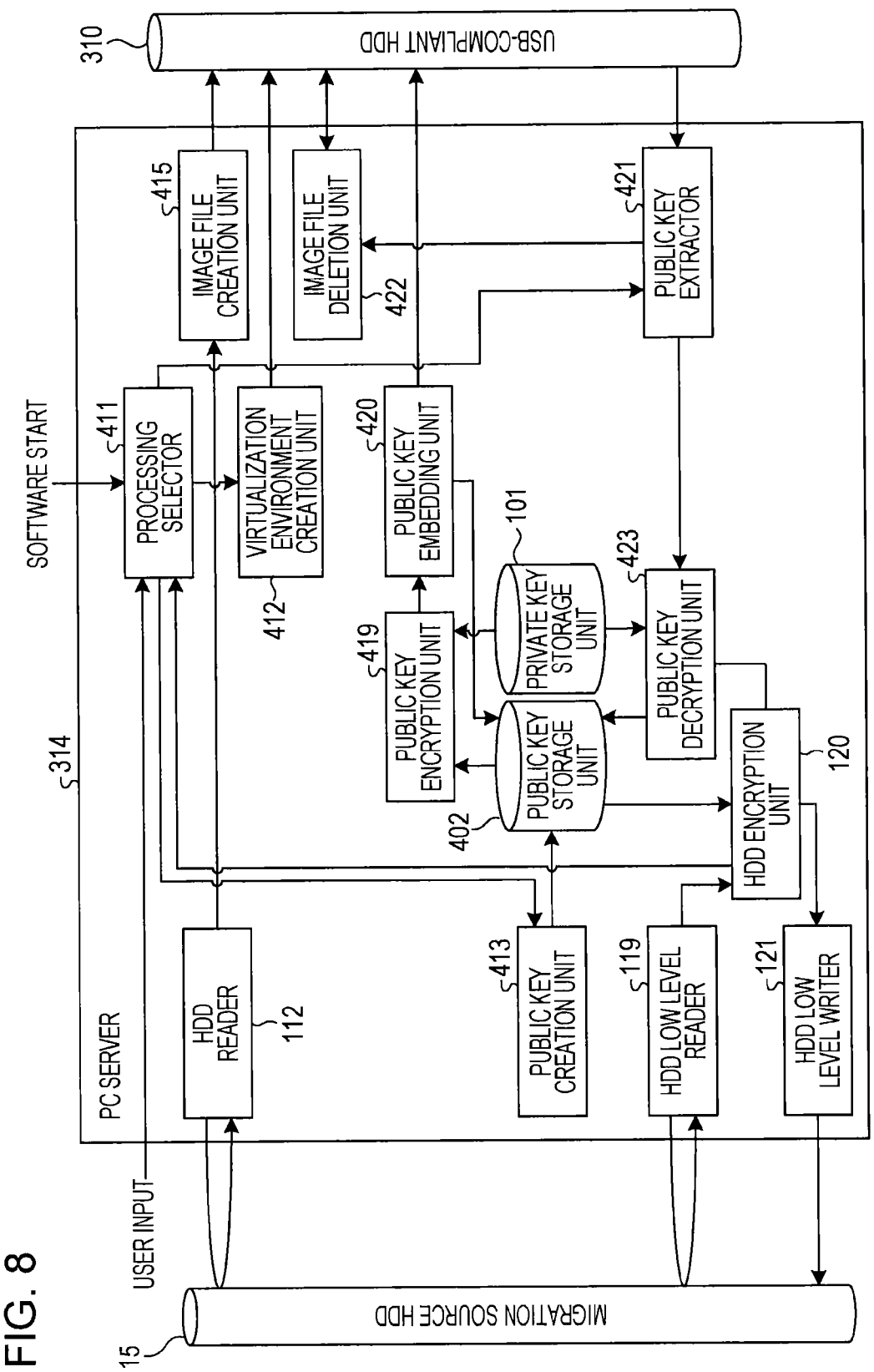
FIG. 8 is a functional block diagram illustrating the functional configuration of a PC server according to the second embodiment.

Next, the functional configuration of a PC server according to the second embodiment will be described with reference to FIG. 8. FIG. 8 is a functional block diagram illustrating the functional configuration of a PC server according to the second embodiment. As illustrated in FIG. 8, the PC server 314 according to the second embodiment includes the private key storage unit 101, a public key storage unit 402, a processing selector 411, a virtualization environment creation unit 412, a public key creation unit 413, the HDD reader 112, and an image file creation unit 415. The PC server 314 further includes the HDD low level reader 119, the HDD encryption unit 120, the HDD low level writer 121, a public key encryption unit 419, and a public key embedding unit 420. The PC server 314 still further includes a public key extractor 421, an image file deletion unit 422, and a public key decryption unit 423.

The public key storage unit 402 stores a public key. For example, the public key storage unit 402 stores the encryption key Ka and the decryption key Kb created by the public key creation unit 413 to be described later. The public key storage unit 402 further stores the decryption key Kb decrypted by the public key decryption unit 423.

When the processing selector 411 receives the selection of migration to a cloud environment from a user, the processing selector 411 instructs the virtualization environment creation unit 412 to create a virtualization environment in the USB-compliant HDD 310. In addition, the processing selector 411 instructs the public key creation unit 413 to create a public key.

When the processing selector 411 receives the selection of switching back from the cloud environment from a user, the processing selector 411 instructs the public key extractor 421 to extract the decryption key Kb' from the USB-compliant HDD 310.

The virtualization environment creation unit 412 creates a virtualization environment in the USB-compliant HDD 310. The creation of a virtualization environment means ensuring the capacity of a storage area.

When the public key creation unit 413 is notified by the processing selector 411 that the selection of migration processing has been received, the public key creation unit 413 creates a public key and stores the created public key in the public key storage unit 402.

The image file creation unit 415 creates an image file from information received from the HDD reader 112, and transfers the created image file to the USB-compliant HDD 310 so as to cause the USB-compliant HDD 310 to store the image file.

The public key encryption unit 419 encrypts the decryption key Kb created by the public key creation unit 413 with the private key K1 stored in the private key storage unit 101 so as to create the decryption key Kb', and outputs the encrypted decryption key Kb' to the public key embedding unit 420.

The public key embedding unit 420 embeds the decryption key Kb' encrypted by the public key encryption unit 419 into the USB-compliant HDD 310. After embedding the encrypted public key into the USB-compliant HDD 310, the public key embedding unit 420 deletes the encryption key Ka and the encrypted decryption key Kb'.

When the public key extractor 421 is notified by the processing selector 411 that the selection of switching-back processing has been received, the public key extractor 421 extracts the encrypted decryption key Kb' that has been embedded into the USB-compliant HDD 310 by the public key embedding unit 420.

The public key extractor 421 outputs the extracted decryption key Kb' to the public key decryption unit 423 and notifies the image file deletion unit 422 that the decryption key Kb' has been extracted from the USB-compliant HDD 310.

When the image file deletion unit 422 is notified by the public key extractor 421 that the decryption key Kb' has been extracted, the image file deletion unit 422 deletes the image file from USB-compliant HDD 310 and receives a notification that the deletion of the image file has been completed from the USB-compliant HDD 310.

The public key decryption unit 423 decrypts the decryption key Kb' extracted by the public key extractor 421 with the private key K1 read from the private key storage unit 101, and stores the decrypted decryption key Kb in the public key storage unit 402.

The private key storage unit 101 and the public key storage unit 402 are included in a storage device such as a semiconductor memory element or hard disk. The components including the processing selector 411 to the public key decryption unit 423 are provided in the form of an electronic circuit such as a Central Processing Unit (CPU) or a Micro Processing Unit (MPU).

[Processing Operation in Information Processing System According to Second Embodiment]

Next, processing operations performed in the information processing system 300 according to the second embodiment will be described with reference to FIGS. 9 and 10. Processing operations performed in the information processing system 300 according to the second embodiment at the time of migration to a cloud environment will be described with reference to FIG. 9. Processing operations performed in the information processing system 300 according to the second embodiment at the time of switching back from the cloud environment will be described with reference to FIG. 10.

(Process of Migration to Cloud Environment)

Figure 9:
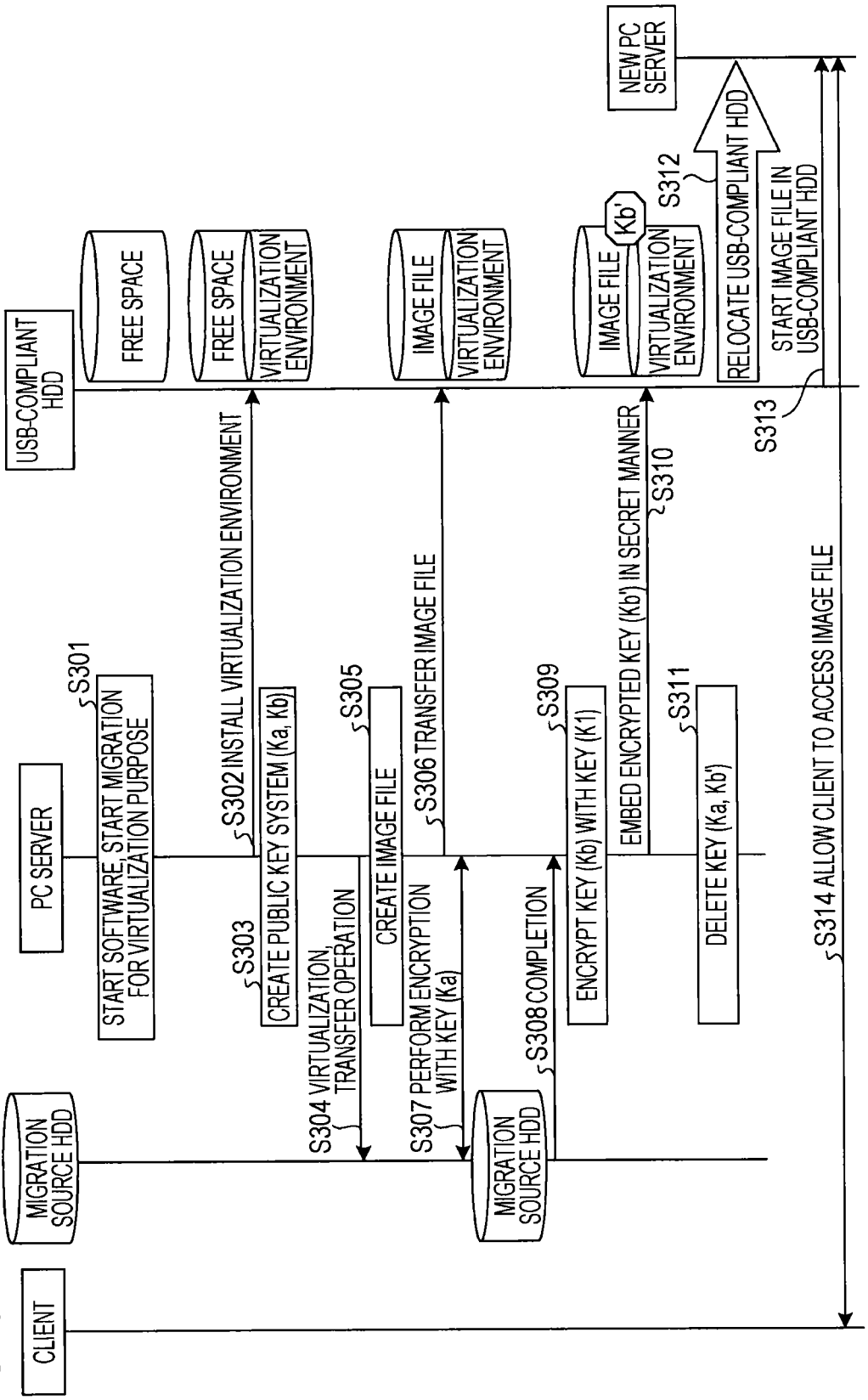
FIG. 9 is a sequence diagram illustrating processing operations performed in an information processing system according to the second embodiment at the time of migration to another PC server environment.

FIG. 9 is a sequence diagram illustrating processing operations performed in an information processing system according to the second embodiment at the time of migration to another PC server environment. As illustrated in FIG. 9, in the PC server 314, when the automatic virtualization and shredder software 313 is started, the processing selector 411 starts virtualization migration processing (operation S301).

The virtualization environment creation unit 412 creates a virtualization environment in the USB-compliant HDD 310 (operation S302). The public key creation unit 413 creates a public key (operation S303). The HDD reader 112 reads information including an OS, an application, and data stored in the HDD 15 and outputs the read information to the image file creation unit 415 (operation S304).

The image file creation unit 415 creates an image file (operation S305), and transfers the created image file to the USB-compliant HDD 310 (operation S306).

When the HDD encryption unit 120 is notified by the public key decryption unit 118 that the encryption key Ka' has been decrypted, the HDD encryption unit 120 encrypts the binary data, which has been read from the HDD 15 by the HDD low level reader 119, with the encryption key Ka (operation S307).

The HDD low level writer 121 writes the encrypted binary data received from the HDD encryption unit 120 back into the HDD 15 and notifies the HDD encryption unit 120 that the encrypted binary data has been written back into the HDD 15 (operation S308).

The public key encryption unit 419 encrypts the decryption key Kb read from the public key storage unit 402 with the private key K1 (operation S309). The public key embedding unit 420 embeds the encrypted decryption key Kb' into the USB-compliant HDD 310 (operation S310). After this operation, the public key embedding unit 420 deletes the encryption key Ka and the encrypted decryption key Kb' from the public key storage unit 402 (operation S311).

The USB-compliant HDD 310 is moved in the PC server 320 (operation S312). The PC server 320 starts the image file in the USB-compliant HDD 310 (operation S313). As a result, the client 11 can access the image file in the PC server 320 (operation S314).

(Switching Back from Cloud Environment)

Figure 10:
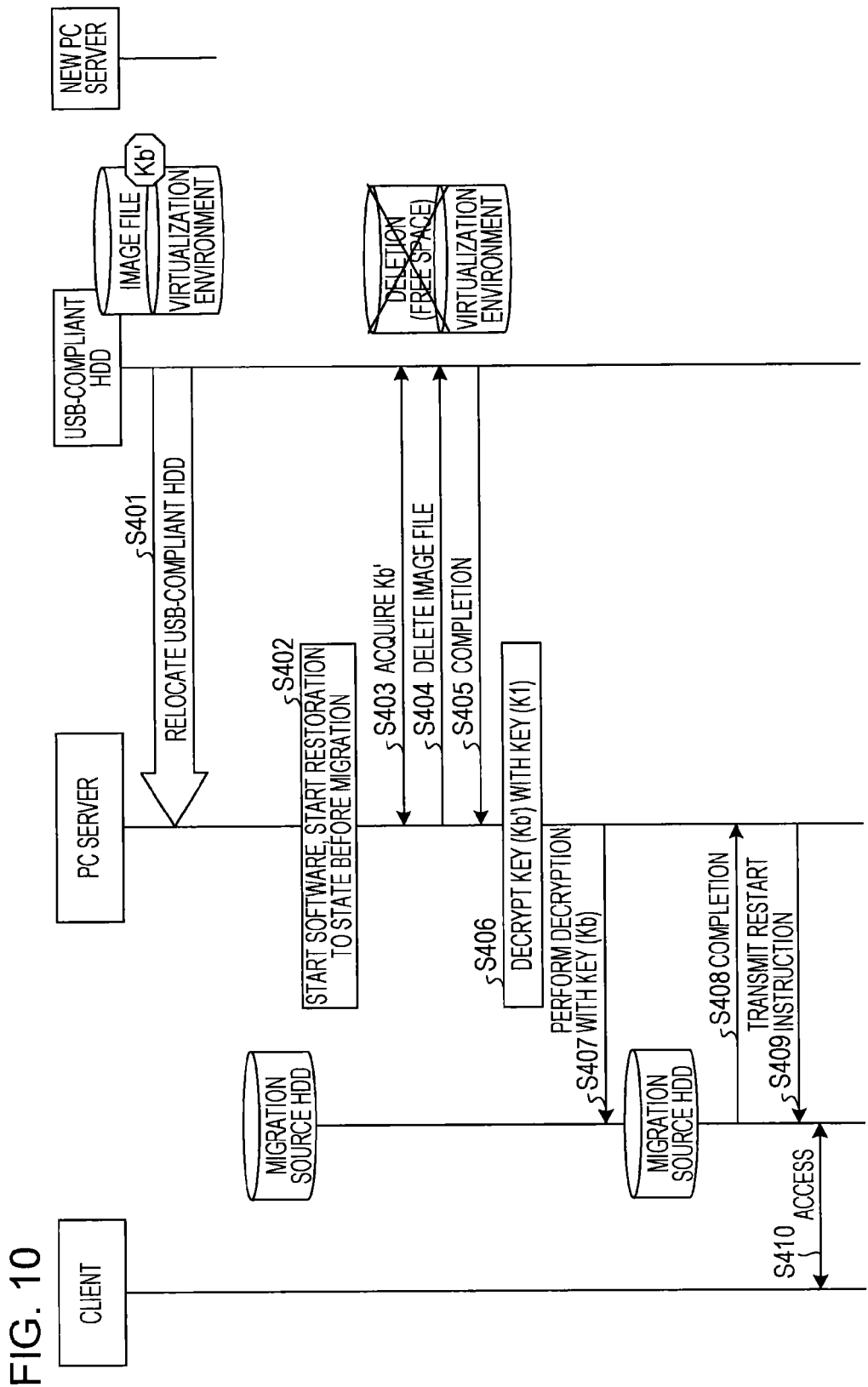
FIG. 10 is a sequence diagram illustrating processing operations performed in an information processing system according to the second embodiment at the time of switching back from another PC server environment.

FIG. 10 is a sequence diagram illustrating processing operations performed in an information processing system according to the second embodiment at the time of switching back from another PC server environment. As illustrated in FIG. 10, the USB-compliant HDD 310 is moved in the PC server 314 (operation S401). When the PC server 314 starts the automatic virtualization and shredder software 313, the processing selector 411 instructs the start of processing for restoring a state before migration (operation S402).

The public key extractor 421 extracts the encrypted decryption key Kb' embedded into the USB-compliant HDD 310 (operation S403). The image file deletion unit 422 deletes the image file from the USB-compliant HDD 310 (operation S404) and receives from the USB-compliant HDD 310 a notification that the deletion of the image file has been completed (operation S405).

The public key decryption unit 423 decrypts the encrypted decryption key Kb' with the private key K1 (operation S406). When the HDD encryption unit 120 is notified by the public key decryption unit 423 that the decryption key Kb has been obtained by decryption, the HDD encryption unit 120 decrypts the encrypted binary data, which has been read from the HDD 15 by the HDD low level reader 119, with the decryption key Kb (operation S407).

The HDD low level writer 121 writes the decrypted binary data received from the HDD encryption unit 120 back into the HDD 15 and notifies the HDD encryption unit 120 that the binary data has been written back into the HDD 15 (operation S408).

When the processing selector 411 is notified by the HDD encryption unit 120 that the decryption of the HDD 15 has been completed, the processing selector 411 instructs a user to restart the PC server 314 via an output unit (not illustrated) (operation S409). As a result, the client 11 can access the HDD 15 in the PC server 314 (operation S410).

[Effect of Second Embodiment]

As described previously, in the second embodiment, even in a case where the migration of software to another PC server in a local environment is automated, license violation does not occur.

[Third Embodiment]

An information processing apparatus disclosed herein may be implemented in various different forms other than the above-described embodiments. An information processing apparatus according to the third embodiment will be described.

(System Configuration, etc.)

All or a part of the processes described in the above-described embodiments as being automatically performed may be manually performed. Alternatively, all or a part of the processes described as being manually performed may be automatically performed with a method in the related art. In addition, the processing procedures, the control procedures, and the specific names that are described in the above-described embodiments and illustrated in the drawings may be optionally changed unless otherwise specified.

The illustrated components are functional and conceptual components, and do not necessarily have to be physically configured as illustrated in the drawings. For example, in the PC server 14, the HDD reader 112 and the image file creation unit 113 may be integrated. All or a part of processing functions performed in devices may be implemented by a CPU or a program to be analyzed and executed by the CPU, or may be realized as a piece of hardware with wired logic.

(Program)

Various pieces of processing in the above-described embodiments may be implemented by causing a computer system such as a personal computer or a workstation to execute a program prepared in advance. An example of a computer system for executing a program having the same function as that of the above-described embodiments will be described below.

Figure 11:
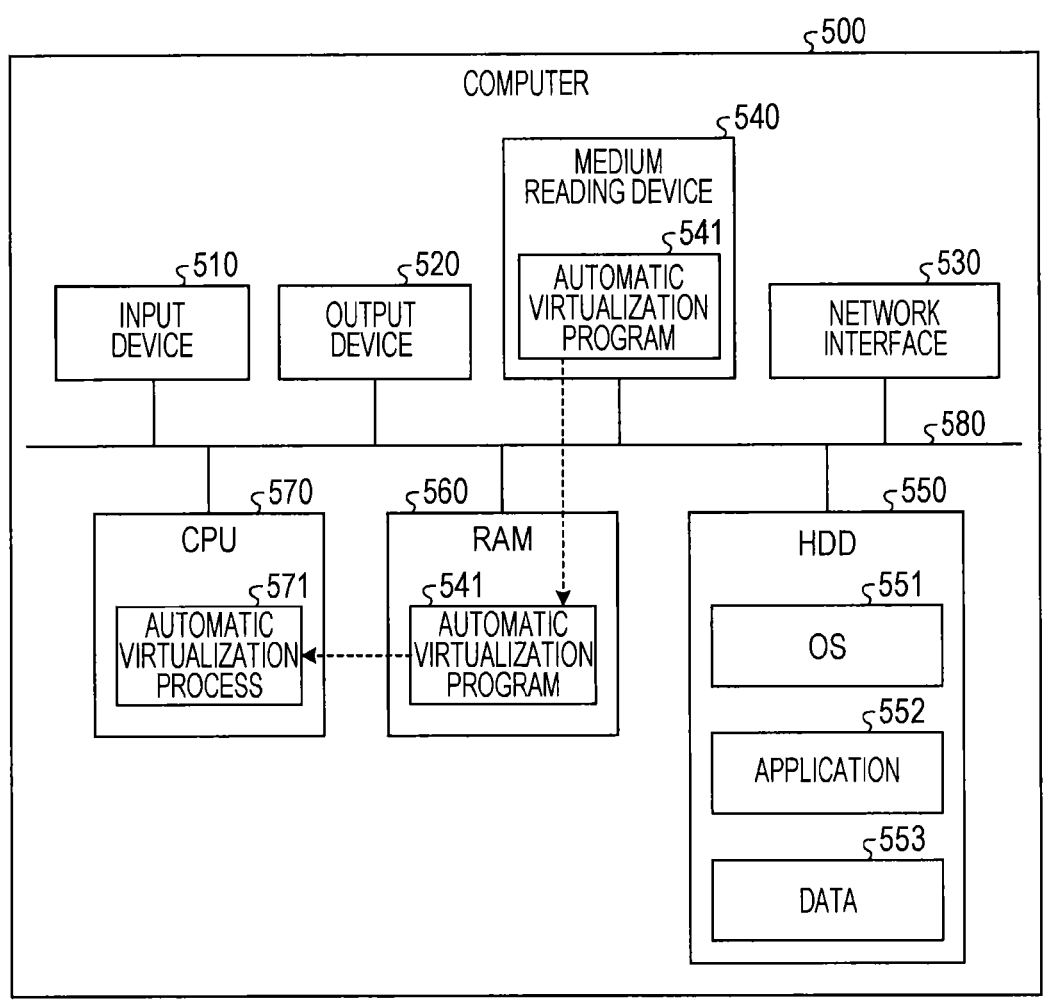
FIG. 11 is a diagram illustrating an example of a computer for executing an automatic virtualization program.
Figure 12:
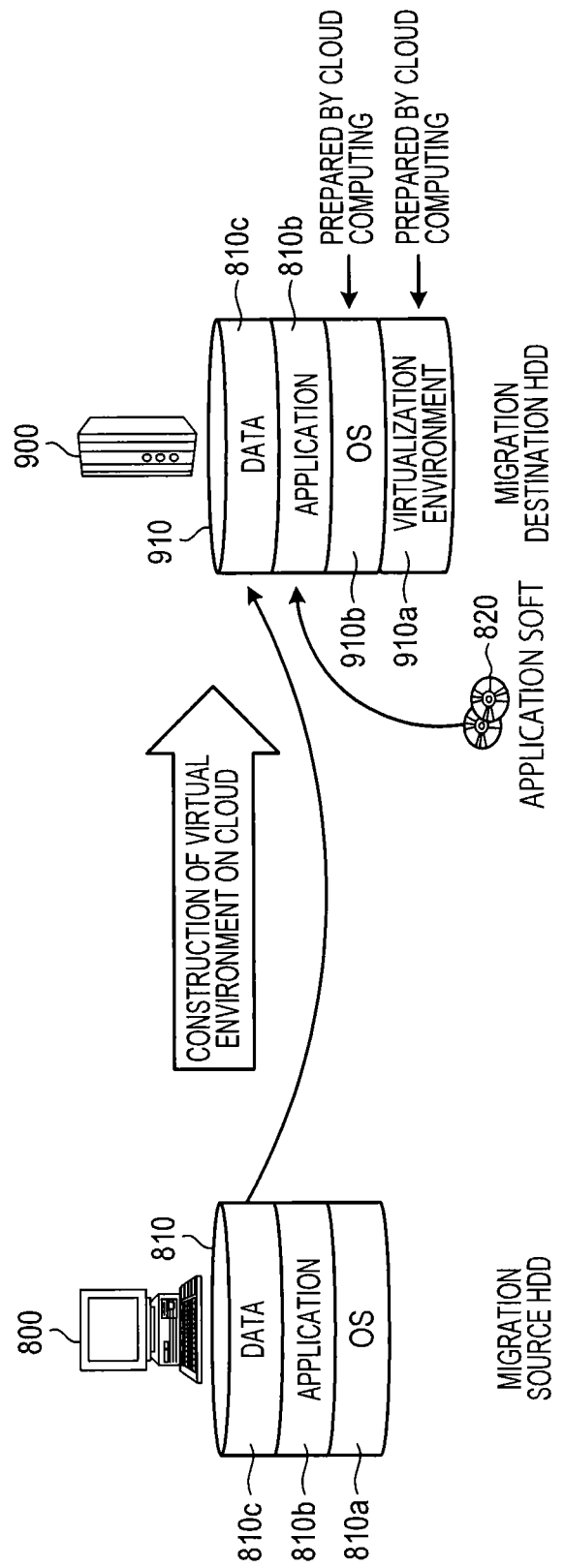
FIG. 12 is a diagram illustrating exemplary migration to a cloud server according to the related art.
Figure 13:
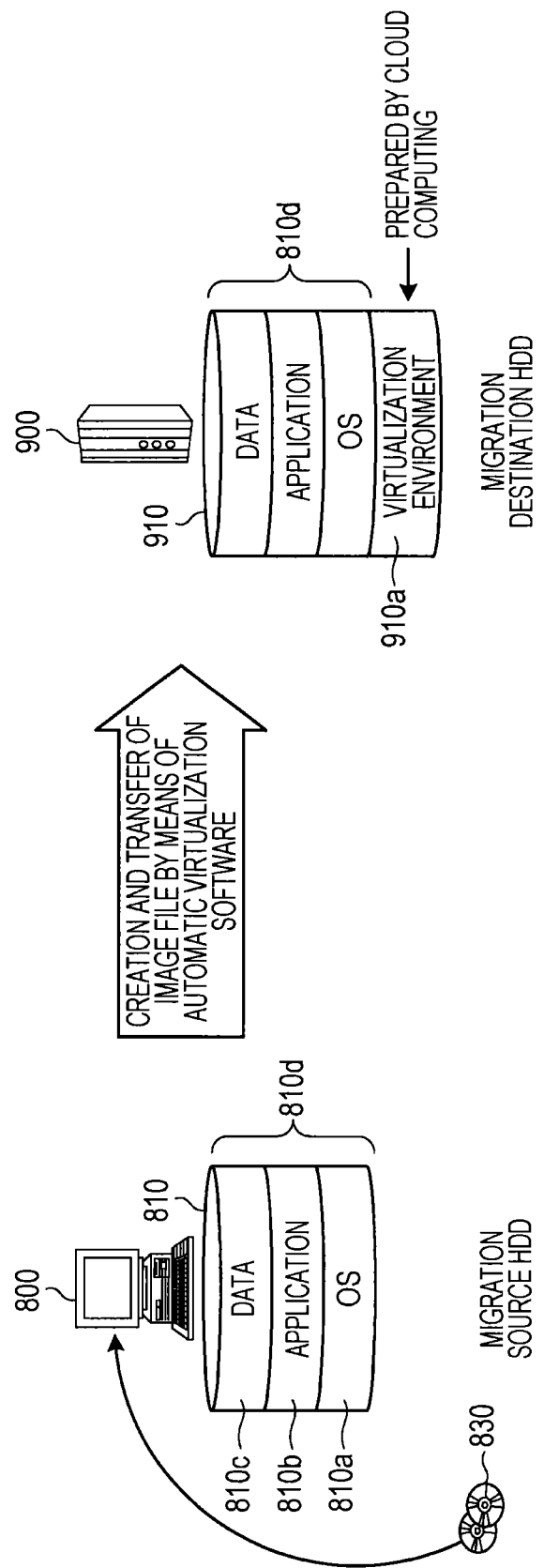
FIG. 13 is a diagram illustrating exemplary migration to a virtualization environment performed with automatic virtualization software.

FIG. 11 is a diagram illustrating an example of a computer for executing an automatic virtualization program. As illustrated in FIG. 11, a computer 500 includes an input device 510 for receiving data and various pieces of setting information from a user and an output device 520 for transmitting a notification about a computer status. The computer 500 further includes a network interface 530 for exchanging data with another apparatus, a medium reading device 540, a Hard Disk Drive (HDD) 550, a Random Access Memory (RAM) 560, a CPU 570, and a bus 580. The components 510 to 570 are connected to the bus 580.

As illustrated in FIG. 11, an automatic virtualization program 541 is stored in the medium reading device 540 in advance. The HDD 550 stores an OS 551, an application 552, and data 553. The CPU 570 reads the automatic virtualization program 541 from the medium reading device 540, decompresses the automatic virtualization program 541 in the RAM 560, and executes the automatic virtualization program 541 as an automatic virtualization process 571. That is, the automatic virtualization process 571 creates an image file from the OS 551, the application 552, and the data 553 stored in the HDD 550 and transmits the created image file to a migration destination apparatus via the network interface 530. In addition, the automatic virtualization process 571 encrypts the HDD 550. That is, the automatic virtualization process 571 performs an operation similar to that of each of the processing selector 111 to the command issuing unit 122 illustrated in FIG. 3. Alternatively, the automatic virtualization process 571 performs an operation similar to that of each of the processing selector 411 to the public key decryption unit 423 illustrated in FIG. 8.

The automatic virtualization program 541 does not necessarily have to be stored in the medium reading device 540. The automatic virtualization program 541 may be stored in a portable physical medium such as a flexible disk (FD), a CD-ROM, an MO disk, a DVD, a magneto-optical disk, or an IC card inserted into the computer 500. Alternatively, the automatic virtualization program 541 may be stored in a fixed physical medium such as an HDD provided outside the computer 500. Alternatively, the automatic virtualization program 541 may be stored in another computer system connected to the computer 500 via a public line, the Internet, a Local Area Network (LAN), or a Wide Area Network (WAN). The computer 500 may read the program from one of the above-described physical media and the other computer system and execute the program.

That is, this program may be computer-readably stored in a recording medium such as the above-described portable physical medium, the above-described fixed physical medium, or a communication medium. The computer 500 reads the program from the recording medium and executes the read program, thereby realizing functions similar to those described in the above-described embodiments. The program does not necessarily have to be executed by the computer 500. For example, an embodiment of the present disclosure may also be applied to a case in which another computer system or a server executes the program or a case in which another computer system and a server execute the program in cooperation with each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process, the process comprising:
    creating a copy of information stored in a first storage in a migration source;
    storing the created copy in a second storage in a migration destination apparatus;
    encrypting the first storage in the migration source after storing the copy in the second storage;
    acquiring, from among an encryption key used to encrypt the first storage in the migration source and a decryption key used to decrypt the encrypted first storage in the migration source which are created by the migration destination apparatus, the encrypting key from the migration destination apparatus;
    encrypting the first storage in the migration source with the acquired encryption key;
    requesting the migration destination apparatus to delete the copy stored in the migration destination apparatus;
    acquiring the decryption key from the migration destination apparatus when the copy is deleted from the second storage in the migration destination apparatus; and
    decrypting the first storage in the migration source with the acquired decryption key.

2. The non-transitory computer-readable recording medium according to claim 1, the process further comprising:
    creating an encryption key used to encrypt the first storage in the migration source and a decryption key used to decrypt the encrypted first storage in the migration source;
    transmitting the created decryption key to the migration destination apparatus; and
    encrypting the first storage in the migration source with the created encryption key.

3. The non-transitory computer-readable recording medium according to claim 1:
    wherein the decryption key is encrypted with a private key, and
    wherein the decryption of the first storage in the migration source is performed with the decrypted decryption key that has been encrypted with the private key.

4. The non-transitory computer-readable recording medium according to claim 1, wherein the information stored in the first storage is a software program.

5. The non-transitory computer-readable recording medium according to claim 1, wherein the migration destination apparatus includes a cloud physical server including the second storage, and the migration destination apparatus includes a cloud management sever that is configured to create the encryption key.

6. The non-transitory computer-readable recording medium according to claim 5, wherein the encryption key is created by the cloud management sever after the copy is stored in the second storage.

7. An automatic virtualization method of causing a computer to execute an automatic virtualization process, the process comprising:

creating a copy of information stored in a first storage in a migration source;
storing the created copy in a second storage in a migration destination apparatus;
encrypting the first storage in the migration source after storing the copy in the second storage;
acquiring, from among an encryption key used to encrypt the first storage in the migration source and a decryption key used to decrypt the encrypted first storage in the migration source which are created by the migration destination apparatus, the encrypting key from the migration destination apparatus;
encrypting the first storage in the migration source with the acquired encryption key;
requesting the migration destination apparatus to delete the copy stored in the migration destination apparatus;
acquiring the decryption key from the migration destination apparatus when the copy is deleted from the second storage in the migration destination apparatus; and
decrypting the first storage in the migration source with the acquired decryption key.

8. An information processing apparatus comprising:

a memory; and a processor coupled to the memory and configured to:

create a copy of information stored in a first storage in a migration source;
store the created copy in a second storage in a migration destination apparatus;
encrypt the first storage in the migration source after storing the copy in the second storage;
acquire, from among an encryption key used to encrypt the first storage in the migration source and a decryption key used to decrypt the encrypted first storage in the migration source which are created by the migration destination apparatus, the encrypting key from the migration destination apparatus;
encrypt the first storage in the migration source with the acquired encryption key;
request the migration destination apparatus to delete the copy stored in the migration destination apparatus;
acquire the decryption key from the migration destination apparatus when the copy is deleted from the second storage in the migration destination apparatus; and
decrypt the first storage in the migration source with the acquired decryption key.

* * * * *

UNITED STATES PATENT AND TRADEMARK OFFICE
CERTIFICATE OF CORRECTION

PATENT NO.         : 8,806,226 B2
APPLICATION NO.    : 13/661701
DATED              : August 12, 2014
INVENTOR(S)        : Katuyoshi Tsuhara It is certified that error appears in the above-identified patent and that said Letters Patent is hereby corrected as shown below:

In the Claims

Column 17, Line 8, Claim 5, delete "sever" and insert -- server --, therefor.

Column 17, Line 12, Claim 6, delete "sever" and insert -- server --, therefor.

Signed and Sealed this
Fourth Day of November, 2014

Michelle K. Lee
*Deputy Director of the United States Patent and Trademark Office*